(12) United States Patent  (10) Patent No.: US 8,331,625 B2
Yamazaki  (45) Date of Patent: Dec. 11, 2012

(54) DISTANCE MEASURING DEVICE AND METHOD, AND COMPUTER PROGRAM

(75) Inventor: Osamu Yamazaki, Saitama (JP)

(73) Assignee: Pioneer Corporation, Tokyo (JP)

( * ) Notice: Subject to any disclaimer, the term of this patent is extended or adjusted under 35 U.S.C. 154(b) by 917 days.

(21) Appl. No.: 12/440,650

(22) PCT Filed: Sep. 13, 2006

(86) PCT No.: PCT/JP2006/318169
§ 371 (c)(1),
(2), (4) Date: Apr. 8, 2009

(87) PCT Pub. No.: WO2008/032376
PCT Pub. Date: Mar. 20, 2008

(65) Prior Publication Data
US 2009/0279740 A1    Nov. 12, 2009

(51) Int. Cl.
*G06K 9/00* (2006.01)
*G01C 3/00* (2006.01)
*G01C 5/00* (2006.01)

(52) U.S. Cl. ............. 382/106; 382/295; 382/298; 356/3

(58) Field of Classification Search .................. 382/100, 382/106, 201, 293–299; 356/3
See application file for complete search history.

(56) References Cited

U.S. PATENT DOCUMENTS

| | | | | |
|---|---|---|---|---|
| 6,330,353 B1 * | 12/2001 | Lai et al. | ........................ | 382/147 |
| 6,683,677 B2 * | 1/2004 | Chon et al. | ....................... | 356/28 |
| 7,194,110 B2 * | 3/2007 | Qian | ............................... | 382/103 |
| 7,239,718 B2 * | 7/2007 | Park et al. | ...................... | 382/103 |
| 7,894,638 B2 * | 2/2011 | Nakada et al. | ................ | 382/118 |
| 2008/0253608 A1 * | 10/2008 | Long et al. | ..................... | 382/100 |

FOREIGN PATENT DOCUMENTS

| | | |
|---|---|---|
| JP | 07-078240 | 3/1995 |
| JP | 7-218251 | 8/1995 |
| JP | 2000-121354 | 4/2000 |
| JP | 2005-28903 | 2/2005 |
| JP | 2006-172026 | 6/2006 |
| JP | 2006-234492 | 9/2006 |

OTHER PUBLICATIONS

IEEE Trans. on System, Man and Cybernetics, vol. 19, No. 6, Nov./Dec. 1989 pp. 1426-1446.
Journal of Institute of Electronics and Communication Engineers of Japan, 86/6 col. J-69-D No. pp. 967-974.

* cited by examiner

*Primary Examiner* — Brian P Werner
*Assistant Examiner* — Shefali Goradia
(74) *Attorney, Agent, or Firm* — Young & Thompson

(57) ABSTRACT

A distance measuring device (1) is included of a feature point detecting element (31) for detecting a set of feature points from a plurality of images (2) picked up at a plurality of places (a, b) by a pickup element, a change detecting element (33) for detecting relative changes among images with respect to the detected set of the feature points, and a first specifying element (8) for specifying rotation quantities of the image pickup element among the places in accordance with the detected changes. Here, the feature point detecting element detects a set of points (P1, P2, P3, P4) composing lines (310, 320) that belong to a stationary object and that are substantially perpendicular to the optical axis of the image pickup element as a set of feature points.

15 Claims, 3 Drawing Sheets

DISTANCE MEASURING DEVICE AND METHOD, AND COMPUTER PROGRAM

TECHNICAL FIELD

The present invention relates to a distance measuring apparatus for and method of specifying the displacement parameter (e.g. the amount of rotation and the amount of parallel displacement) of an imaging element, such as a camera, mounted on an automobile or train, and using it for the measurement of a distance (hereinafter, also simply referred to as "ranging") between the imaging element and an object, and a computer program which makes a computer function as such a distance measuring apparatus.

BACKGROUND ART

In case of the ranging by this type of distance measuring apparatus, for example, a stereo camera is generally expensive because it is necessary to match optical features of left and right cameras. On the other hand, if a monocular camera is used to reduce the cost, although the ranging is possible from the principle of triangulation, it is necessary to obtain the displacement parameter of the imaging element: the three-axis amount of rotation and the three-dimensional amount of parallel displacement. In specifying the displacement parameter, there is known a technology in which several feature points are selected from taken images and in which the displacement of the feature points is focused on to specify the displacement parameter. If noise is selected as the feature point, it is hardly possible to ignore an influence of errors. Thus, there is a possibility that the displacement parameter cannot be accurately obtained.

Thus, there is suggested a technology of searching for the displacement of the feature point between the images, evaluating the errors, and statistically detecting the displacement parameter (refer to a non-patent document 1).

There is also suggested a technology of using the displacement of the vanishing point of horizontal lines which are parallel to each other and of the vanishing point of perpendicular or vertical line segments which are parallel to each other, in order to separately obtain the amount of rotation and the amount of parallel displacement, of the displacement parameter (refer to a non-patent document 2).

Moreover, there is also suggested a technology of detecting the vanishing point by using a white line on a road (refer to a patent document 1).
Non-patent document 1: IEEE TRANS. ON SYSTEM, MAN AND CYBERNETICS, VOL. 19, NO. 6, NOVEMBER/DECEMBER 1989 pp. 1426-1446
Non-patent document 2: Journal of Institute of Electronics and Communication Engineers of Japan, '86/6 VOL. J-69-D NO. 6 pp. 967-974
Patent document 1: Japanese Patent Application Laid Open No. Hei 7-78240

DISCLOSURE OF INVENTION

Subject to be Solved by the Invention

However, according to the aforementioned technologies disclosed in the various documents, the following problems likely occur.

Firstly, in the technology disclosed in the aforementioned non-patent document 1, a statistical method is required in order to reduce an influence of mistakenly selecting the feature point; namely, it is necessary to obtain an optical flow with respect to many feature points, and a huge amount of calculation is likely required.

In the technology disclosed in the aforementioned non-patent document 2, the straight lines need to be parallel in the real world. Therefore, the errors could be caused by selecting the straight lines which are not parallel, as candidates, like a power pole.

In the technology disclosed in the aforementioned patent document 1, the errors could be caused when the white line is not the straight line because it cannot be adjusted.

In view of the aforementioned problems, it is therefore an object of the present invention to provide a distance measuring apparatus and method in which it is resistant to errors while it is possible to preferably reduce the calculation amount required for the specification of the aforementioned displacement parameter, and a computer program which makes a computer function as such a distance measuring apparatus.

Means for Solving the Subject (Distance Measuring Apparatus)

The above object of the present invention can be achieved by a distance measuring apparatus provided with: a feature point detecting device for detecting a set of feature points from a plurality of images taken at a plurality of points by an imaging element; a change detecting device for detecting a change in relative positions between the images, with respect to the detected set of feature points; and a first specifying device for specifying amount of rotation between the points of the imaging element, on the basis of the detected change, the feature point detecting device detecting a set of points which belongs to a stationary object and which constitutes a line segment in a substantially perpendicular relationship with an optical axis of the imaging element, as the set of the feature points.

According to the distance measuring apparatus of the present invention, firstly, from the plurality of images taken by the imaging element such as a camera at the plurality of points, the set of the feature points is detected by the feature point detecting device having a memory, an arithmetic element, and the like. The term "plurality" herein denotes that it is greater than or equal to two, and it is typically two. In this case, the imaging element mounted on a vehicle or the like is displaced between two points, and it takes two images. The "image" is a map on the two-dimensional plane of an object. The "displacement" includes rotation displacement and parallel displacement, and the "displacement parameter" includes the amount of rotation and the amount of parallel displacement. The "feature point" is a point or a small area in the image, which can be easily detected in image processing.

Then, the change in the relative positions between the images is detected with respect to the detected set of the feature points, by the change detecting device having a memory, an arithmetic element, and the like. The "change" herein is a change in the relative positions between the images of the respective feature points, and in other words, a change in the mutual position relation. It is such a concept that if the imaging point or the direction of the imaging element varies, although it is the same object (which is the feature point in this case), the position on the taken image varies.

Then, on the basis of the detected change, the amount of rotation between the points of the imaging element is specified by the first specifying device having a memory, an arithmetic element, and the like.

Here, in general, if the feature point detecting device randomly detects the set of the feature points, for example, a statistical method is used to specify the amount of rotation. Thus, the calculation amount is likely huge.

Moreover, if the amount of rotation is specified by using the displacement of the vanishing point of horizontal lines which are parallel to each other and of the vanishing point of perpendicular line segments which are parallel to each other, errors could be caused by selecting straight lines which are not parallel, like a power pole.

However, the feature point detecting device in the present invention detects the set of the feature points which belongs to the stationary object, such as a power pole and a building, and which can be approximated to be mutually equally distant in the optical direction from the imaging element. The term "stationary" includes a low speed enough to be ignored, compared to the moving speed of the imaging element, and it does not necessarily require being absolutely still. The expression "which can be approximated to be mutually equally distant in the optical direction" is a concept that $z_1 \approx z_2$ can be applied in the coordinates of the imaged two feature points $(x_1, y_1, z_1)$ and $(x_2, y_2, z_2)$. In other words, it is a concept that the line segment connecting the two feature points and a line of the optical axis of the imaging element are substantially perpendicular. The term "substantially perpendicular" indicates that the lines are allowed to cross not only at right angle but also at an angle shifted from the right angle by a predetermined margin. The predetermined margin is preferably smaller in terms of approximation accuracy; however, the acceptable range may be determined in advance by experiments or simulation, in accordance with the accuracy practically required, with respect to the distance measured by the distance measuring apparatus. The most typical and preferable feature point that satisfies the setting condition of the imaging element described later is a power pole, a building, an advertising sign, and the like, which are placed substantially perpendicular to a road surface. If the imaging area of the imaging element is placed substantially perpendicular to the road surface, the optical axis of the imaging element is substantially parallel to the road surface, and hence the power pole placed substantially perpendicular to the road surface is substantially perpendicular to the optical axis of the imaging element. Therefore, the power pole and the imaging area are substantially parallel to each other. Here, perpendicular lines to the imaging area from one edge point and the other edge point of the power pole are both substantially parallel to the optical axis. At this time, in a quadrilateral formed by four points in total, which are one edge point, the other edge point, and two points of feet of the perpendicular lines in the imaging area, two pairs of opposite sides are substantially parallel to each other, and adjacent sides are perpendicular, so the quadrilateral is a rectangle. Therefore, it can be approximated that the distances on the optical axis from the edge points of the power pole to the imaging area of the imaging element are equal to each other. The method of recognizing the stationary object can be realized by, for example, template matching or by detecting a so-called perpendicular edge or vertical edge in the image by using a well-known edge detection filter. Incidentally, the extent of a range to approximate the difference in distance in the optical axis direction of the two feature points may be determined in advance by simulation or experiments, as an allowance obtained by inverse calculation from the accuracy required for the distance measuring apparatus.

Then, the calculation is performed to specify the amount of rotation, on the premise that each feature point constitutes the line segment described above, and in other words, that the distance on the optical axis from each feature point to the imaging area of the imaging element is approximated to be equal. At this time, the relation between the feature points is restricted, so calculation formulae can be prepared to reduce the calculation amount, compared to the case without the premise.

Therefore, it is possible to preferably reduce the calculation amount required for the specification of the amount of rotation as one example of the displacement parameter. In addition, the calculation amount is also reduced by limiting an optical flow search range only to the vicinity of the perpendicular line segment. Moreover, selecting the feature point from a certain line segment, which is a set of points, reduces a possibility of selecting noise and makes it resistant to errors, so it is extremely useful in practice.

In one aspect of the distance measuring apparatus of the present invention, the change detecting device detects a change between the images in a slope of the line segment as the change, and the first specifying device specifies a roll angle of amount of rotation, on the basis of the detected change in the slope.

According to this aspect, the change between the images in the slope of the line segment is detected as the change by the change detecting device. The "roll angle" herein is rotation around the optical axis of the imaging element. If the imaging element rotates around the optical axis, the slope is changed in the map on the imaging element of the line segment which crosses the optical axis. Therefore, on the basis of the change in the detected slope, the roll angle of the amount of rotation is specified by the first specifying device.

In an aspect in which the roll angle is specified as described above, the feature point detecting device may detect two line segments which have mutually different distances in the optical axis direction, the change detecting device may detect a change in relative positions between the images with respect to the detected two line segments, as the change, and the first specifying device may specify at least one of a yaw angle and a pitch angle of the amount of rotation, on the basis of the change with respect to the two line segments.

According to this aspect, firstly, the two line segments which have mutually different distances in the optical axis are detected by the feature point detecting device. Then, as the change, the change in the relative positions between the images with respect to the detected two line segments is detected by the feature point detecting device. Here, according to the study of the present inventors, it is found that the change in the relative positions between the images of the line segments is caused by an element which depends on the distance in the optical axis direction and an element which is independent of the distance in the optical axis direction and which depends on the yaw angle and the pitch angle. Thus, by canceling the influence of the distance in the optical axis on the basis of the change with respect to the line segments which have mutually different distances in the optical axis direction, at least one of the yaw angle and the pitch angle of the amount of rotation can be specified by the first specifying device.

Moreover, in an aspect in which the various amounts of rotation are specified as described above, it may be further provided with: a measuring device for measuring a distance between the points of the imaging element; and a second specifying device for specifying amount of parallel displacement between the points of the imaging element, on the basis of the specified amount of rotation and the measured distance between the points of the imaging element.

According to this aspect, the distance between the points in which the imaging element is displaced is measured by the measuring device having, for example, a displacement sensor. On the basis of the measured distance between the points and the amount of rotation specified in the aforementioned manner, the second specifying device can specify the amount of parallel displacement between the points of the imaging element. Specifically, by rotating the three-dimensional coordinate axes of the imaging element at the both points on the basis of the specified amount of rotation, the axes at the both points are made parallel to each other. As a result, the both coordinate axes can be matched to each other by the parallel displacement, and the amount of parallel displacement at this time can be specified as the desired amount of parallel displacement.

In another aspect of the distance measuring apparatus of the present invention, the amount of rotation or the amount of parallel displacement is statistically specified.

According to this aspect, the feature points are detected in not only the two line segments but also more line segments, and the change between the images is detected as described above. On the basis of the result, the amount of rotation or the amount of parallel displacement is statistically specified, so that it is possible to receive the benefits according to the aforementioned aspects while improving the specification accuracy, which is extremely useful in practice.

In another aspect of the distance measuring apparatus of the present invention, the change detecting device detects the change about an arbitrary feature point, in addition to the set of the feature points, and the distance measuring apparatus is further provided with a calculating device for calculating a distance to the arbitrary feature point, at least on the basis of the detected change.

According to this aspect, the change about the arbitrary feature point is detected by the change detecting device, in addition to the set of the feature points. The term "arbitrary" herein is a concept including the feature point which does not belong to the line segment. Then, the distance to the arbitrary feature point is calculated by the calculating device, at least on the basis of the detected change about the arbitrary feature point. In other words, by applying the result of the amount of rotation or the like, it is possible to calculate the distance to the arbitrary feature point, so that it is extremely useful in practice.

In another aspect of the distance measuring apparatus of the present invention, the feature point detecting device detects the line segment from each of the plurality of images, and the change detecting device detects the change by identifying that each of the detected line segments is derived from a same object.

According to this aspect, the line segment is detected from each of the plurality of images, and the change in the relative positions is detected by identifying that each of the detected line segments is derived from a same object. For example, a power pole is detected from each of two images, and if it is recognized that they are the same power pole, the change in the relative positions of the power pole between the images is detected. According to this aspect, it is possible to specify the displacement parameter easily, compared to the case where the feature point which belongs to the line segment from the first image is detected and the change is detected between the images of the feature point.

(Distance Measuring Method)

The above object of the present invention can be also achieved by a distance measuring method provided with: a feature point detecting process of detecting a set of feature points from a plurality of images taken at a plurality of points by an imaging element; a change detecting process of detecting a change in relative positions between the images, with respect to the detected set of feature points; and a first specifying process of specifying amount of rotation between the points of the imaging element, on the basis of the detected change, the feature point detecting process detecting a set of points which belongs to a stationary object and which constitutes a line segment in a substantially perpendicular relationship with an optical axis of the imaging element, as the set of the feature points.

According to the distance measuring method of the present invention, it is possible to receive the save various aspects as those of the distance measuring apparatus of the present invention.

(Computer Program)

The above object of the present invention can be also achieved by a computer program making a computer function as the distance measuring apparatus according to any one of claims 1 to 8.

According to the computer program of the present invention, the distance measuring apparatus of the present invention described above can be relatively easily realized as a computer reads and executes the computer program from a program storage device, such as a ROM, a CD-ROM, a DVD-ROM, and a hard disk, or as it executes the computer program after downloading the program through a communication device.

Incidentally, even in the computer program of the present invention, it is possible to receive the save various aspects as those of the distance measuring apparatus of the present invention.

As explained above, according to the distance measuring apparatus of the present invention, it is provided with the feature point detecting device, the change detecting device, and the first specifying device. According to the distance measuring method of the present invention, it is provided with the feature point detecting process, the change detecting process, and the first specifying process. Thus, it is possible to preferably reduce the calculation amount required for the specification of the displacement parameter, yet it is resistant to errors. Moreover, according to the computer program of the present invention, it makes a computer function as the feature point detecting device, the change detecting device, and the first specifying device. Thus, it is possible to establish the aforementioned distance measuring apparatus of the present invention, relatively easily.

The above object of the present invention can be also achieved by a computer program product in a computer-readable medium for tangibly embodying a program of instructions executable by a computer provided in the aforementioned distance measuring apparatus of the present invention (including its various aspects), the computer program product making the computer function as at least one portion of the distance measuring apparatus (specifically, for example, at least one of the feature point detecting device, the change detecting device, and the first specifying device).

According to the computer program product of the present invention, the distance measuring apparatus of the present invention described above can be embodied relatively readily, by loading the computer program product from a recording medium for storing the computer program product, such as a ROM, a CD-ROM, a DVD-ROM, a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the distance measuring apparatus of the present invention described above.

The operation and other advantages of the present invention will become more apparent from the embodiments explained below.

DESCRIPTION OF REFERENCE CODES 1 distance measuring apparatus
2 image recording device
31 perpendicular line segment detecting device
32 perpendicular line segment recording device
33 perpendicular line segment displacement detecting device
91 imaging element displacement distance detecting device
8 imaging element displacement parameter detecting device
5 stationary object feature point detecting device
6 feature point recording device
65 feature point displacement amount detecting device
93 feature point distance detecting device

BEST MODE FOR CARRYING OUT THE INVENTION

Hereinafter, the best mode for carrying out the invention will be explained in each embodiment in order, with reference to the drawings.

(1) First Embodiment

The structure and operation process of a distance measuring apparatus in a first embodiment will be described with reference to FIG. 1 to FIG. 6.

(1-1) As for Moving Stereoscopic Method and Displacement Parameter

Before the structure and operation process of the distance measuring apparatus are explained, a moving stereoscopic method will be explained as an example of use of the displacement parameter. According to the moving stereoscopic method, an imaging element such as a camera is displaced to take images at a plurality of points, and the image taken at each point is used to measure the distance to the object on the basis of the principle of triangulation. In the measurement, it is necessary to obtain the displacement parameter which indicates how the camera is displaced between the imaging points, i.e. a rotational component and a parallel displacement component.

Figure 1:
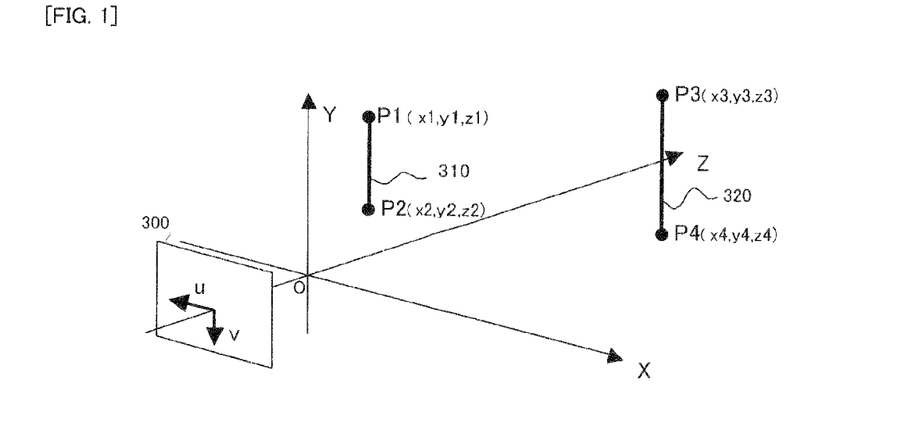
FIG. 1 is a perspective view showing a coordinate system in a first embodiment.

In order to give an explanation to the moving stereoscopic method, firstly, a three-dimensional coordinate system in which a pinhole is used as an origin O is considered using FIG. 1. FIG. 1 is a perspective view showing the coordinate system in the first embodiment.

In FIG. 1, it is assumed that the pinhole of a pinhole camera is the origin O, that the lateral direction and longitudinal direction of an imaging area 300 disposed at a focal distance are an X axis and a Y axis, respectively, and that an optical axis is a Z axis. If the two-dimensional coordinates of the imaging area 300 are (u, v), the point of three-dimensional coordinates (x, y, z) is mapped as in an Equation 1. Incidentally, line segments 310 and 320 will be described later.

$$\begin{bmatrix} u \\ v \end{bmatrix} = f \begin{bmatrix} x/z \\ y/z \end{bmatrix} \qquad \text{[Equation 1]}$$

Figure 2:
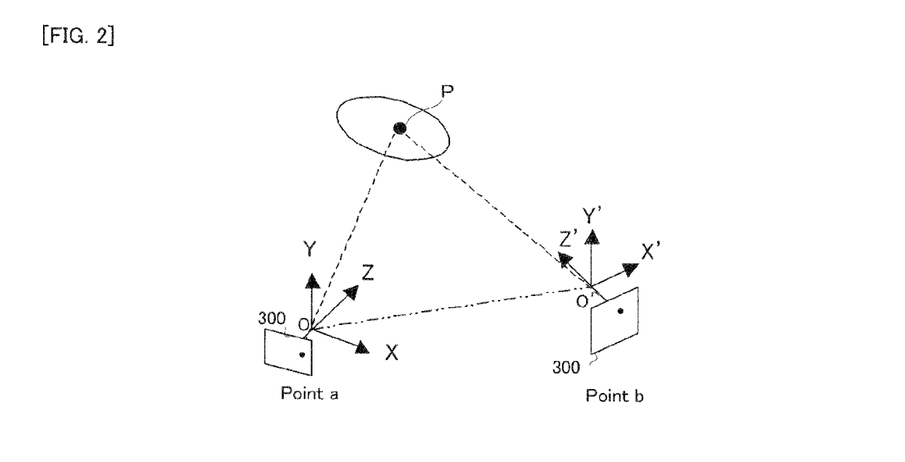
FIG. 2 is a perspective view showing that images are taken at a plurality of points in a moving stereo method.

A set of a plurality of points mapped constitutes an image. Taking the image at a plurality of points will be explained in FIG. 2. FIG. 2 is a perspective view showing that the images are taken at a plurality of points in a moving stereo method.

In FIG. 2, the imaging element having the imaging area 300 is displaced from a point a to a point b around a feature point P, and it takes images of the feature point P at both points. At this time, the displacement parameter of the imaging element is broken into a three-axis rotation matrix by a yaw angle $\phi$, a pitch angle $\theta$, and a roll angle $\Phi$, and three-axis parallel displacement elements $\Delta x$, $\Delta y$, and $\Delta z$. The transformation from a coordinate system (X, Y, Z) of the imaging area 300 at the point a to a coordinate system (X', Y', Z') of the imaging area 300 at the point b is expressed by an Equation 2.

$$\begin{bmatrix} X' \\ Y' \\ Z' \end{bmatrix} = R(\phi, \theta, \varphi) \begin{bmatrix} X \\ Y \\ Z \end{bmatrix} + \begin{bmatrix} \Delta x \\ \Delta y \\ \Delta z \end{bmatrix} \qquad \text{[Equation 2]}$$

Here, the Equation 2 is an equation with six unknowns of $\phi$, $\theta$, $\Phi$, $\Delta x$, $\Delta y$, and $\Delta z$. Therefore, if six feature points are simply selected in the image and if it is known how far the feature points are displaced on the (u, v) plane between the points a and b, the Equation 2 is to be solved using the Equation 1. However, if the six feature points are randomly selected in this method, noise is likely selected as the feature point, so it is hardly possible to ignore an influence of errors. In order to reduce the errors, a statistic process can be used to improve the accuracy; however, it has a huge calculation amount.

There is also suggested a technology of using the displacement of the vanishing point of horizontal lines which are parallel to each other and of the vanishing point of perpendicular line segments which are parallel to each other, in order to separately obtain the amount of rotation and the amount of parallel displacement, of the displacement parameter (refer to a non-patent document 2). According to the technology, the straight lines need to be parallel in the real world. Therefore, the errors could be caused by selecting the straight lines which are not parallel, like a power pole which is an object highly likely imaged but which narrows to a point, as candidates. Moreover, the method of obtaining the disappearance point from the white line on the road cannot be applied when the white line is not the straight line. Thus, it is hard to obtain the displacement parameter.

Figure 3:
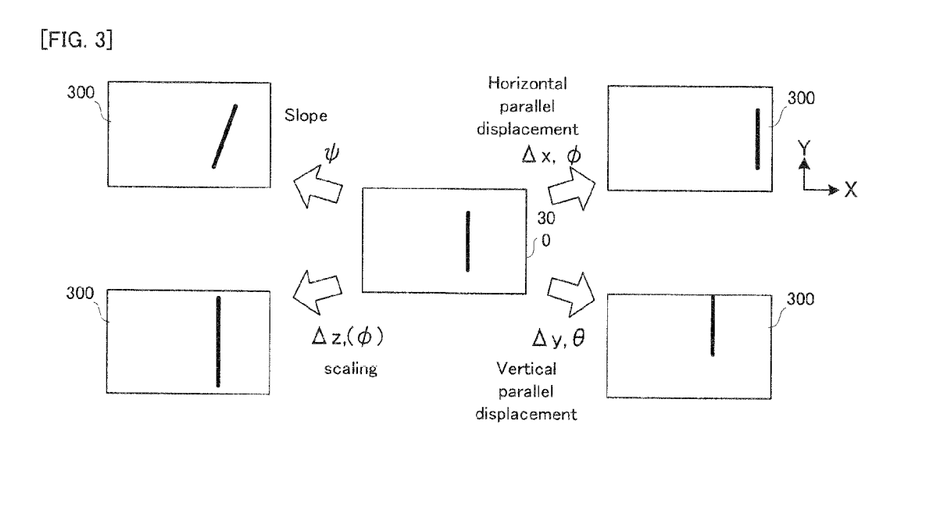
FIG. 3 is a conceptual view showing parameters which contribute to various displacements of the map of a line segment in the first embodiment.

Thus, in the embodiment, it is tried to reduce the calculation amount required to solve the Equation 2 to be resistant to errors, by the restriction of the displacement of a movable body (e.g. a vehicle), in which the degree of freedom in a yaw direction is high due to the control of a steering wheel but the degree of freedom in pitching and rolling is significantly low and in which a sudden change is rare in the yaw direction; and by the condition of the object imaged by the imaging element provided for the movable body. For example, it is assumed that a camera is mounted on an automobile such that the optical axis is in a travel direction and that the automobile is driving on a road. If the camera has the short imaging interval, relations described later in FIG. 3 are established from the following two premises, resulting in solving the aforementioned problems.

As the first premise, changes in the pitch angle $\theta$ and the roll angle $\Phi$ in the coordinates between two points are sufficiently small. A change in the yaw angle $\phi$ is not so large although it is not to the extent of the pitch angle $\theta$ and the roll angle $\Phi$.

As the second premise, many objects such as an advertising sign or a building are considered to include line segments substantially perpendicular to the optical axis, which are typically line segments perpendicular to a road surface. Therefore, two arbitrary feature points included in the object can be approximated to be equally distant from the automobile (or the imaging area 300). If a line horizontal to the ground is the object, the possible range of the yaw angle $\phi$ between the horizontal line and the imaging area 300 is extremely greater than the pitch angle $\theta$. Therefore, in case of the feature point in the horizontal line, the distance difference is greater than that of the perpendicular line segment, and a process of judging whether to be in a range to allow this distance difference is required to use a method described later, so that it is disadvantageous.

The feature of the perpendicular line segment which appeared in the premise will be explained using FIG. 3. FIG. 3 is a conceptual view showing parameters which contribute to various displacements of the map of a line segment in the first embodiment.

In FIG. 3, the perpendicular line segments are selected from the images taken in the imaging areas 300. According to the premises, the relation between the displacement between two images of the line segments and the parameters which greatly contribute to the displacement is as follows. Specifically, the roll angle $\Phi$ contributes to a "slope", $\Delta z$ (and the yaw angle $\phi$ in some cases) contributes to "scaling", $\Delta x$ and the yaw angle $\phi$ contribute to "horizontal (X-axis direction) parallel displacement", and $\Delta y$ and the pitch angle $\theta$ contribute to "vertical (Y-axis direction) parallel displacement". Here, as described later, the map of the parallel displacement component is inversely proportional to the distance in the Z-axis direction of the object, and an influence of the map of the rotation component is constant, regardless of the displacement of the map. Therefore, by detecting the displacement of the maps of two perpendicular line segments which have different distances, the displacement parameter can be obtained. Incidentally, in the method of detecting the line segments which have different distances, the line segments which have different scales between the two images may be selected.

In order to receive the aforementioned merits, the distance measuring apparatus in the embodiment is constructed as follows.

(1-2) Basic Structure

Figure 4:
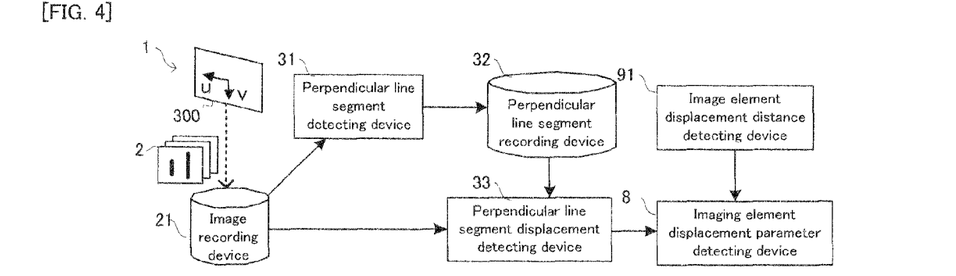
FIG. 4 is a block diagram conceptually showing the basic structure of a distance measuring apparatus in the first embodiment of the present invention.

Next, the basic structure of the distance measuring apparatus in the embodiment will be explained with reference to FIG. 4, in addition to FIG. 1 to FIG. 3. FIG. 4 is a block diagram conceptually showing the basic structure of the distance measuring apparatus in the first embodiment of the present invention.

As shown in FIG. 4, a distance measuring apparatus 1 in the embodiment is provided with an image recording device 21, a perpendicular line segment detecting device 31, a perpendicular line segment recording device 32, a perpendicular line segment displacement detecting device 33, an imaging element displacement distance detecting device 91, and an imaging element displacement parameter detecting device 8. The distance measuring apparatus 1 is adapted to preferably reduce the calculation amount required for the specification of the displacement parameter of the imaging element to be resistant to errors. The structure of each device will be detailed below.

The image recording device 21 is provided with a hard disk or the like. The image recording device 21 is adapted to record images A and B taken or imaged by the imaging area 300 of the imaging element at a plurality of points.

The perpendicular line segment detecting device 31 is one example of the "feature point detecting device" of the present invention, and it is provided with a memory, an arithmetic element, and the like. The perpendicular line segment detecting device 31 is adapted to detect line segments (typically, perpendicular line segments) substantially perpendicular to the optical axis of the imaging element from the recorded images A and B by detecting a perpendicular or vertical edge.

The perpendicular line segment recording device 32 is provided with a hard disk or the like, and it is adapted to record the detected line segments.

The perpendicular line segment displacement detecting device 33 is one example of the "change detecting device" of the present invention, and it is provided with a memory, an arithmetic element, and the like. The perpendicular line segment displacement detecting device 33 is adapted to detect the vertical and horizontal displacement of the recorded line segments between the images.

The imaging element displacement distance detecting device 91 is one example of the "measuring device" of the present invention, and it is provided with a memory, an arithmetic element, and the like. The imaging element displacement distance detecting device 91 detects a displacement distance r at which the imaging element is displaced from the point a to the point b. For example, if the imaging element is mounted on a vehicle, a counted vehicle-speed pulse may be multiplied by a travel distance per unit pulse.

The imaging element displacement parameter detecting device 8 is one example of the "first specifying device" and the "second specifying device" of the preset invention, and it is provided with a memory, an arithmetic element, and the like. The imaging element displacement parameter detecting device 8 is adapted to detect the displacement parameter of the distance measuring device 1 on the basis of the detected vertical and horizontal displacement and the displacement distance r.

As described above, according to the distance measuring apparatus 1 constructed as shown in FIG. 4, it is possible to preferably reduce the calculation amount required for the specification of the displacement parameter of the imaging element to be resistant to errors.

(1-3) Operation Principle

Figure 5:
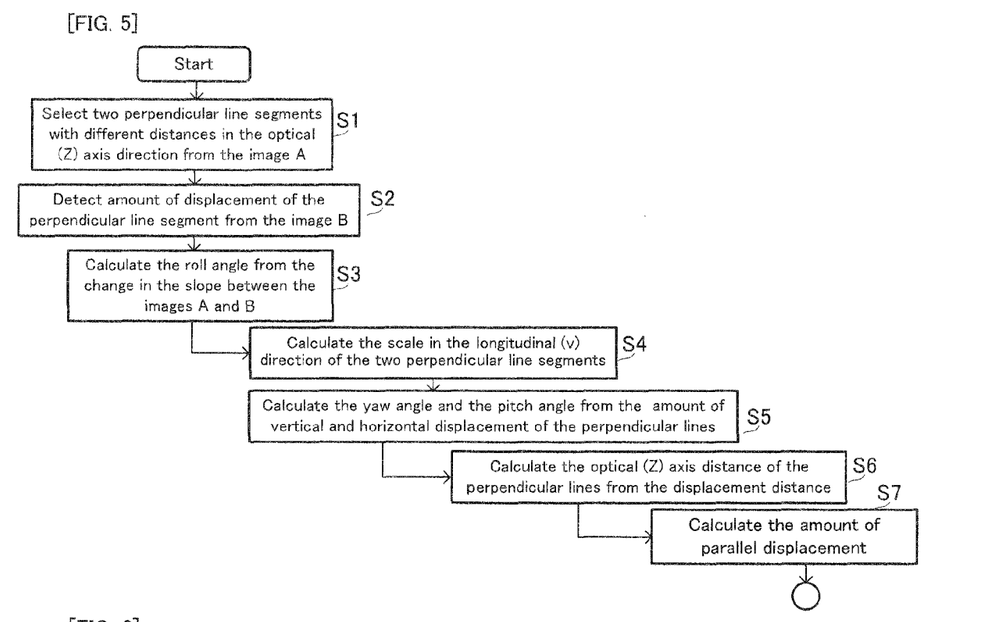
FIG. 5 is a flowchart showing the operation process of the distance measuring apparatus in the first embodiment of the present invention.

Next, the operation principle of the distance measuring apparatus 1 in the embodiment as constructed above will be explained with reference to FIG. 5, in addition to FIG. 1 to FIG. 4. FIG. 5 is a flowchart showing the operation process of the distance measuring apparatus in the first embodiment of the present invention.

In FIG. 5, firstly, the distance measuring apparatus 1 selects line segments 310 and 320 which have different distances in the optical (Z) axis direction and which are perpendicular to the ground, from the image A taken at the point a (step S1). If the optical axis of the imaging area 300 is substantially parallel to the ground, the coordinates of edge points P1 and P2 of the line segment 310 can be approximated to $x_1 \approx x_2$ and $z_1 \approx z_2$. The same is true for the line segment 320.

Then, the amount of displacement of the line segment 310 is detected from the image B taken at the point b (step S2), and the roll angle $\phi$ is calculated from a change in the slope between the images A and B (step S3). Specifically, firstly, when the imaging area 300 is displaced as shown in the Equation 2, the Equation 2 can be approximated by an Equation 3 under the assumption that the yaw angle $\phi$, the pitch angle $\theta$, and v roll angle $\Phi$ are sufficiently small.

$$\begin{pmatrix} x' \\ y' \\ z' \end{pmatrix} = \begin{pmatrix} 1 & -\psi & -\phi \\ \psi & 1 & -\theta \\ \phi & \theta & 1 \end{pmatrix} \begin{pmatrix} x \\ y \\ z \end{pmatrix} + \begin{pmatrix} \Delta x \\ \Delta y \\ \Delta z \end{pmatrix}$$  [Equation 3]

Thus, the map in the imaging area 300 is expressed by an Equation 4.

$$u' = \frac{f(u - \psi v) + f^2(-\phi + \Delta x/z)}{\phi u - \theta v + f(1 + \Delta z/z)}$$ [Equation 4]

$$v' = \frac{f(\psi u - v) + f^2(-\theta + \Delta y/z)}{\phi u - \theta v + f(1 + \Delta z/z)}$$

Here, the maps of the edge points P1 and P2 of the line segment 310 are considered. It is assumed that a range of the value of the pitch angle $\theta$ is sufficiently smaller than that of the yaw angle $\phi$ and $\Delta z/z$. Since $u_1 \approx u_2$ and $z_1 \approx z_2$, the difference in denominator in the Equation 4 of the edge points P1 and P2 is $\phi(u_1-u_2)+\theta(v_1-v_2)+f\Delta z(z_1-z_2)/z_1 z_2$, and it is a value small enough to be ignored, so both may be $\phi u_1 + f(1+\Delta z/z_1)$. Thus, the slope of the perpendicular line segment after the transformation by the Equation 4 is expressed by an Equation 5.

$$\frac{u'_1 - u'_2}{v'_1 - v'_2} = \frac{(u_1 - u_2) - \psi(v_1 - v_2)}{\psi(u_1 - u_2) + (v_1 - v_2)} = \frac{u_1 - u_2}{v_1 - v_2} - \psi$$ [Equation 5]

Therefore, it is possible to obtain the roll angle $\Phi$ from the change in the slope between the images A and B.

Then, a ratio of the height in the longitudinal direction (i.e. v direction) of the two perpendicular line segments is calculated (step S4).

In the line segment 310 of the two perpendicular line segments, if coordinates (u", v") are considered which are obtained by inversely transforming (u', v') by the roll angle $\Phi$ obtained previously, the ratio of the height in the longitudinal direction is expressed by an Equation 6. From a result of calculating this ratio back, the amount of parallel displacement on the (u, v) plane is expressed by an Equation 7.

$$\frac{v''_1 - v''_2}{v_1 - v_2} = \frac{f}{\phi u_1 + f(1 + \Delta z/z_1)} = 1/k_1$$ [Equation 6]

$$k_1 u''_1 - u_1 = f(-\phi + \Delta x/z_1)$$ [Equation 7]
$$k_1 v''_1 - v_1 = f(-\theta + \Delta y/z_1)$$

It can be seen from the Equation 7 that the amount of parallel displacement on the (u, v) plane has a term which is in inverse proportion to the distance $z_1$ and a term which is independent of the distance $z_1$ and which is constant with the rotation angle of the yaw angle $\phi$ or the pitch angle $\theta$. Thus, the ratio of the height in the longitudinal direction is also obtained in the same manner for the edge points P3 and P4 of the line segment 320, which has a different distance, to cancel their influences.

In the line segment 320 of the two perpendicular line segments, the ratio of the height in the longitudinal direction is expressed by an Equation 8, and from a result of calculating this ratio back, the amount of parallel displacement on the (u, v) plane is expressed by an Equation 9.

$$\frac{v''_3 - v''_4}{v_3 - v_4} = \frac{f}{\phi u_3 + f(1 + \Delta z/z_3)} = 1/k_3$$ [Equation 8]

$$k_3 u''_3 - u_3 = f(-\phi + \Delta x/z_3)$$ [Equation 9]
$$k_3 v''_3 - v_3 = f(-\theta + \Delta y/z_3)$$

An Equation 10 is obtained by solving the Equations 6 and 8 for $\Delta z$.

$$z_1/z_3 = \frac{f(k_3 - 1) - \phi u_3}{f(k_1 - 1) - \phi u_1}$$ [Equation 10]

In the same manner, an Equation 11 is obtained by solving the Equations 7 and 9 for $\Delta x$.

$$z_1/z_3 = \frac{k_3 u''_3 - u_3 + f\phi}{k_1 u''_1 - u_1 + f\phi}$$ [Equation 11]

Then, if the right sides are equal in the Equations 10 and 11, the yaw angle $\phi$ is obtained. The same is true for the pitch angle $\theta$. In this manner, the yaw angle $\phi$ and the pitch angle $\theta$ are calculated from the amount of the vertical and horizontal displacement of the perpendicular line segments (step S5).

The, the optical axis distance $z_1$ is calculated from the displacement distance (step S6). Specifically, the displacement distance r between two points is expressed by an Equation 12, so the optical axis distance $z_1$ is obtained by substituting a solution obtained by solving the Equations 6 and 7 for $\Delta x/z_1$, $\Delta y/z_1$, and $\Delta z/z_1$, and the amount of parallel displacement $\Delta x$, $\Delta y$, and $\Delta z$ is also obtained (step S7).

$$(r/z_1)^2 = (\Delta x/z_1)^2 + (\Delta y/z_1)^2 + (\Delta z/z_1)^2$$ [Equation 12]

Of course, the aforementioned calculation may be performed on many line segments to statistically calculate the displacement parameter of the camera.

As described above, according to the embodiment, by selecting the feature points from the points that belong to the line segments 310 and 320, it is possible to preferably reduce the calculation amount required for the specification of the displacement parameter of the imaging element. In addition, the line segments are not necessarily strictly parallel. Therefore, this makes it resistant to errors and facilitates the calculation, so that it is extremely useful in practice.

(2) Second Embodiment

Figure 6:
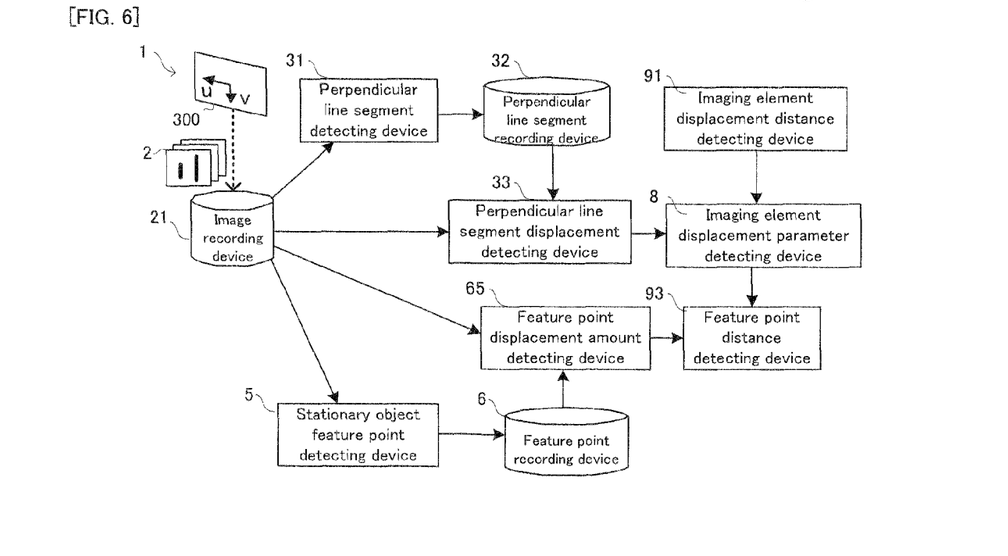
FIG. 6 is a block diagram conceptually showing the basic structure of a distance measuring apparatus in a second embodiment of the present invention.

The structure and operation process of a distance measuring apparatus in a second embodiment will be described with reference to FIG. 6 in addition to FIG. 1 to FIG. 5. FIG. 6 is a block diagram conceptually showing the basic structure of the distance measuring apparatus in the second embodiment of the present invention. Incidentally, the same constituents as those in the aforementioned embodiment carry the same reference numerical, and the explanation thereof will be omitted, as occasion demands.

In FIG. 6, in particular, the distance measuring apparatus 1 in the embodiment is provided with a stationary object feature point detecting device 5, a feature point recording device 6, a feature point displacement amount detecting device 65, and a feature point distance detecting device 93 in addition to the constituents of the first embodiment, and it can measure a distance to a feature point which belongs to another stationary object, relatively easily.

The stationary object feature point detecting device 5 is provided with a memory, an arithmetic element, and the like. The stationary object feature point detecting device 5 is adapted to detect another feature point which belongs to a stationary object other than line segments 310 and 320, as one example of the "arbitrary feature point" of the present invention.

The feature point recording device 6 is provided with a memory, an arithmetic element, and the like, and it is adapted to record the detected another feature point.

The feature point displacement amount detecting device 65 is one example of the "change detecting device" of the present invention, and it is provided with a memory, an arithmetic element, and the like. The feature point displacement amount detecting device 65 is adapted to detect the amount of displacement of the recorded another feature point between the images A and B.

The feature point distance detecting device 93 is one example of the "calculating device" of the present invention, and it is provided with a memory, an arithmetic element, and the like. Then, on the basis of at least the detected amount of displacement between the images A and B with respect to the any feature point, the amount of rotation and the amount of parallel displacement of the imaging element, specified on the imaging element parameter detecting device 8 as described above, are applied to the displacement of the another feature point, to thereby detect the distance to another feature point. Specifically, z is obtained by substituting the three-axis amount of rotation and the three-axis amount of parallel displacement obtained in the aforementioned embodiment, for the Equation 4, and x and y are also obtained from the Equation 1.

As described above, according to the embodiment, by applying the displacement parameter for the amount of displacement between the images A and B of another feature point, it is possible to measure the distance to another feature point, relatively easily, which is extremely useful in practice.

(3) Third Embodiment

Figure 7:
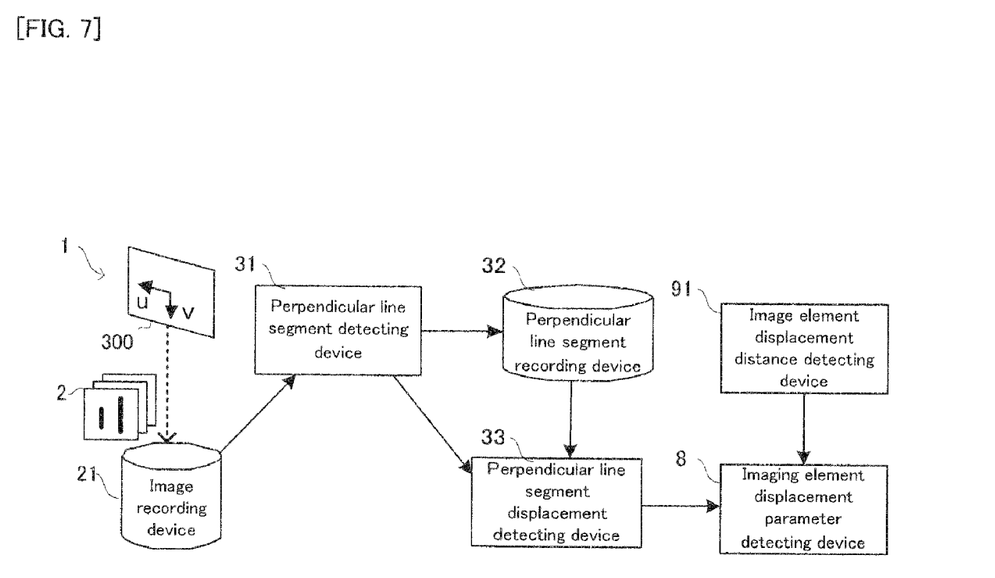
FIG. 7 is a block diagram conceptually showing the basic structure of a distance measuring apparatus in a third embodiment of the present invention.

The structure and operation process of a distance measuring apparatus in a third embodiment will be described with reference to FIG. 7, in addition to FIG. 1 to FIG. 5. FIG. 7 is a block diagram conceptually showing the basic structure of the distance measuring apparatus in the third embodiment of the present invention. Incidentally, the same constituents as those in the aforementioned embodiment carry the same reference numerical, and the explanation thereof will be omitted, as occasion demands.

In FIG. 7, in particular, the perpendicular line segment detecting device 31 detects the perpendicular line segment from the image B. Then, the perpendicular line segment displacement detecting device 33 performs matching between the perpendicular line segment detected from the image B and the perpendicular line segment detected from the image A, i.e. identification that they are the maps of the same object. For example, image values in the vicinity of the perpendicular line segments are compared, or perpendicular edge image values are compared to match the same perpendicular lines between the images. The displacement of the perpendicular line segments is detected by such matching.

As described above, according to the embodiment, since the perpendicular line segments are detected from the images A and B before the displacement of the perpendicular line segments is detected, the processing is easier than the case where the point which belongs to the perpendicular line segment is detected before the displacement of the point is detected.

As explained above, according to the distance measuring apparatus 1 in each embodiment, it is possible to limit or control the calculation amount and errors in obtaining the displacement parameter required for the ranging, so that it is extremely useful in practice.

Moreover, the operation process shown in the aforementioned embodiments may be realized by the distance measuring apparatus built in the distance measuring apparatus or connected to the exterior. Alternatively, it may be realized by operating the distance measuring apparatus on the basis of a distance measuring method provided with a feature point detecting process, a change detecting process, and a first specifying process. Alternatively, it may be realized by making a computer read a computer program, wherein the computer is provided with the image correcting apparatus provided with a feature point detecting device, a change detecting device, and a first specifying device.

Incidentally, the present invention is not limited to the aforementioned embodiments, but various changes may be made, if desired, without departing from the essence or spirit of the invention which can be read from the claims and the entire specification. A distance measuring apparatus and method, and a computer program, all of which involve such changes, are also intended to be within the technical scope of the present invention.

INDUSTRIAL APPLICABILITY

The distance measuring apparatus and method, and the computer program of the present invention can be applied to a distance measuring apparatus, a mobile body detecting apparatus, or an image correcting apparatus. Specifically, they can be applied to an object detecting apparatus, mounted on a vehicle, for detecting an obstacle in the surroundings or a recognizing apparatus for recognizing the three-dimensional position of an object when an object is picked up by a robot hand or the like. They can be also applied to an imaging apparatus such as a digital camera which can correct hand movement. They can be also applied to a distance measuring apparatus or the like which is mounted on various computer equipment for consumer use or for commercial use, or which can be connected to various computer equipment.

The invention claimed is:

1. A distance measuring apparatus comprising:
   a feature point detecting device for detecting a set of feature points from a plurality of images taken at a plurality of points by an imaging element;
   a change detecting device for detecting a change in relative positions between the images, with respect to the detected set of feature points; and a first specifying device for specifying amount of rotation between the points of the imaging element, on the basis of the detected change, said feature point detecting device detecting a set of points which belongs to a stationary object and which constitutes a line segment in a substantially perpendicular relationship with an optical axis of the imaging element, as the set of the feature points.

2. The distance measuring apparatus according to claim 1, wherein said change detecting device detects a change between the images in a slope of the line segment as the change, and said first specifying device specifies a roll angle of amount of rotation, on the basis of the detected change in the slope.

3. The distance measuring apparatus according to claim 2, wherein said feature point detecting device detects two line segments which have mutually different distances in the optical axis direction, said change detecting device detects a change in relative positions between the images with respect to the detected two line segments, as the change, and said first specifying device specifies at least one of a yaw angle and a pitch angle of the amount of rotation, on the basis of the change with respect to the two line segments.

4. The distance measuring apparatus according to claim 3, further comprising:

a measuring device for measuring a distance between the points of the imaging element; and a second specifying device for specifying amount of parallel displacement between the points of the imaging element, on the basis of the specified amount of rotation and the measured distance between the points of the imaging element.

5. The distance measuring apparatus according to claim 4, wherein the amount of rotation or the amount of parallel displacement is statistically specified.

6. The distance measuring apparatus according to claim 4, wherein said feature point detecting device detects the line segment from each of the plurality of images, and said change detecting device detects the change by identifying that each of the detected line segments is derived from a same object.

7. The distance measuring apparatus according to claim 3, wherein said feature point detecting device detects the line segment from each of the plurality of images, and said change detecting device detects the change by identifying that each of the detected line segments is derived from a same object.

8. The distance measuring apparatus according to claim 2, wherein said feature point detecting device detects the line segment from each of the plurality of images, and said change detecting device detects the change by identifying that each of the detected line segments is derived from a same object.

9. The distance measuring apparatus according to claim 1, wherein the amount of rotation is statistically specified.

10. The distance measuring apparatus according to claim 9, wherein said feature point detecting device detects the line segment from each of the plurality of images, and said change detecting device detects the change by identifying that each of the detected line segments is derived from a same object.

11. The distance measuring apparatus according to claim 1, wherein said change detecting device detects the change about an arbitrary feature point, in addition to the set of the feature points, and said distance measuring apparatus further comprises a calculating device for calculating a distance to the arbitrary feature point, at least on the basis of the detected change.

12. The distance measuring apparatus according to claim 11, wherein said feature point detecting device detects the line segment from each of the plurality of images, and said change detecting device detects the change by identifying that each of the detected line segments is derived from a same object.

13. The distance measuring apparatus according to claim 1, wherein said feature point detecting device detects the line segment from each of the plurality of images, and said change detecting device detects the change by identifying that each of the detected line segments is derived from a same object.

14. A distance measuring method comprising:

a feature point detecting process of detecting a set of feature points from a plurality of images taken at a plurality of points by an imaging element;

a change detecting process of detecting a change in relative positions between the images, with respect to the detected set of feature points; and a first specifying process of specifying amount of rotation between the points of the imaging element, on the basis of the detected change, said feature point detecting process detecting a set of points which belongs to a stationary object and which constitutes a line segment in a substantially perpendicular relationship with an optical axis of the imaging element, as the set of the feature points.

15. A non-transitory computer-readable medium containing a computer program for making a computer function as an distance measuring apparatus, said distance measuring apparatus comprising:

a feature point detecting device for detecting a set of feature points from a plurality of images taken at a plurality of points by an imaging element;

a change detecting device for detecting a change in relative positions between the images, with respect to the detected set of feature points; and a first specifying device for specifying amount of rotation between the points of the imaging element, on the basis of the detected change, said feature point detecting device detecting a set of points which belongs to a stationary object and which constitutes a line segment in a substantially perpendicular relationship with an optical axis of the imaging element, as the set of the feature points.

* * * * *